May 9, 1933.  R. W. BROWN  1,908,282
VULCANIZER
Filed July 3, 1929  6 Sheets-Sheet 1
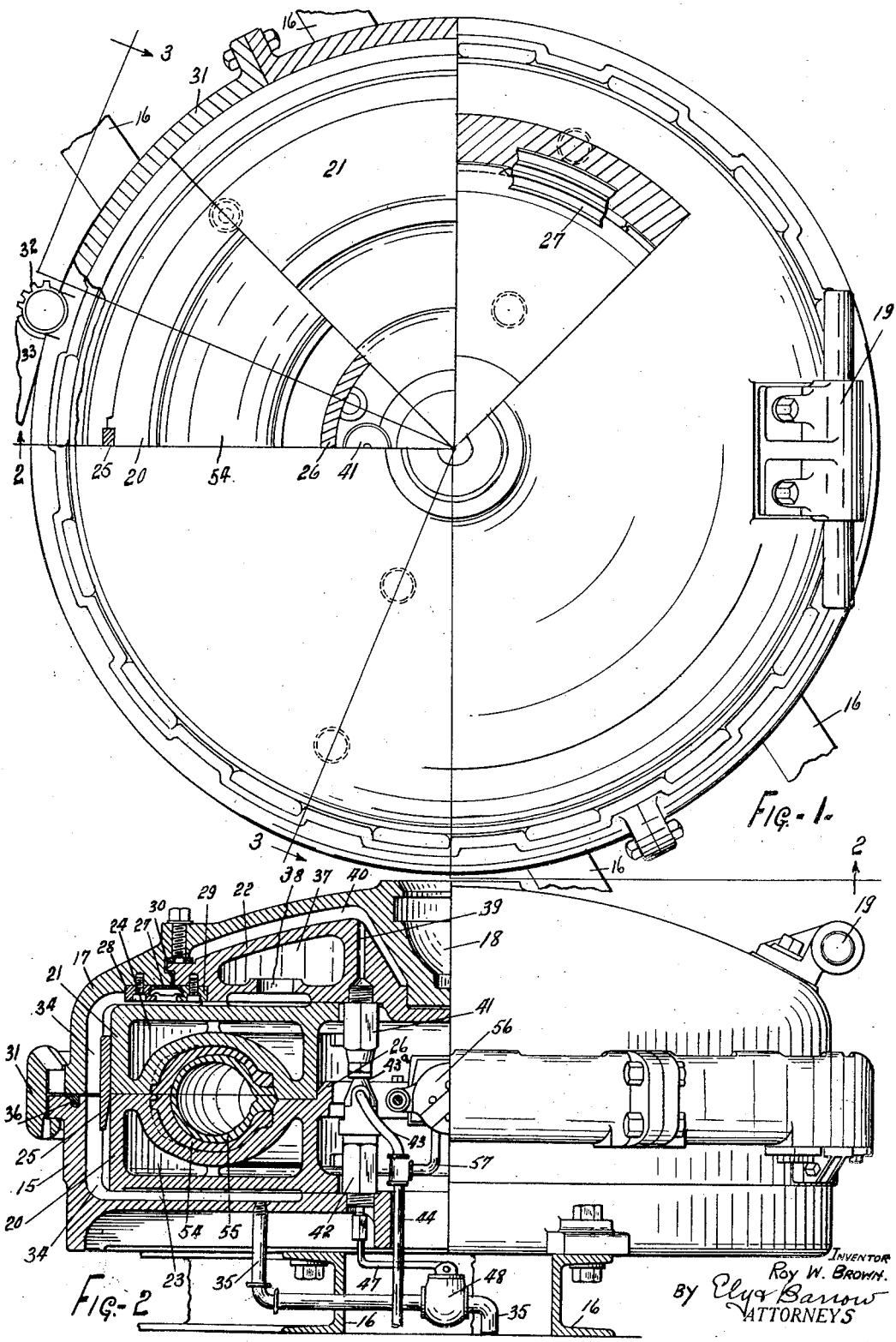

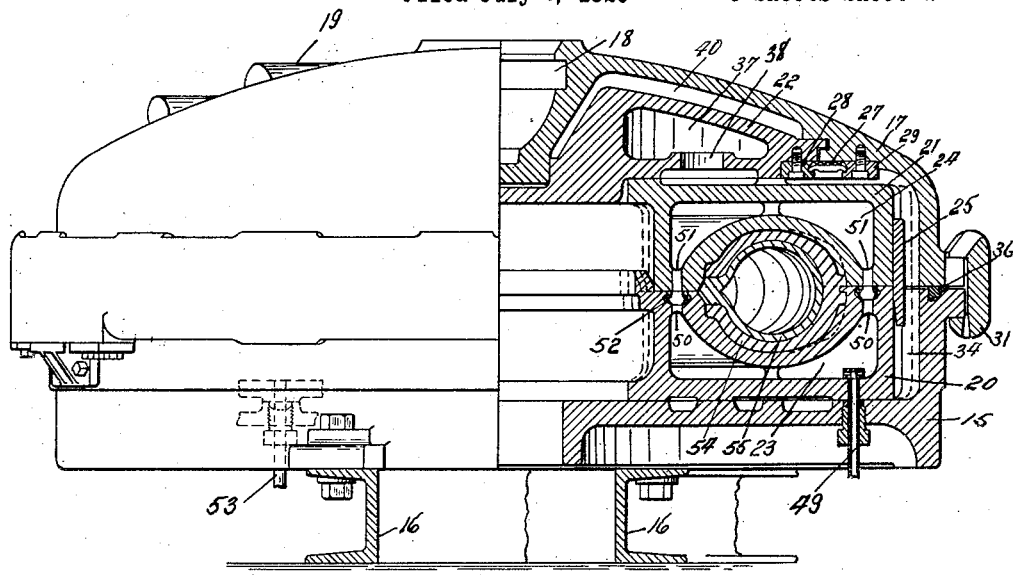
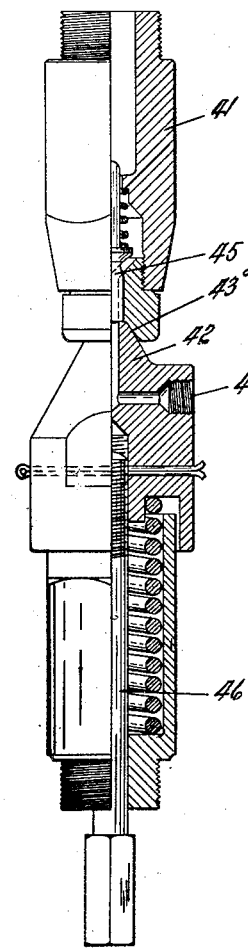
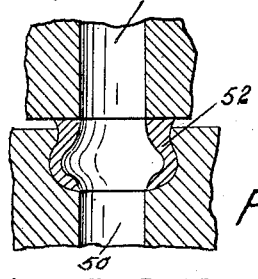
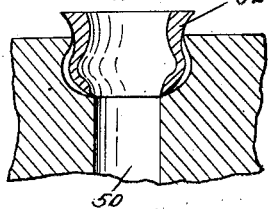
INVENTOR.
Roy W. Brown.
BY Ely & Barrow
ATTORNEYS.

May 9, 1933.  R. W. BROWN  1,908,282
VULCANIZER
Filed July 3, 1929  6 Sheets-Sheet 5

INVENTOR.
Roy W. Brown.
BY Ely & Barrow
ATTORNEYS.

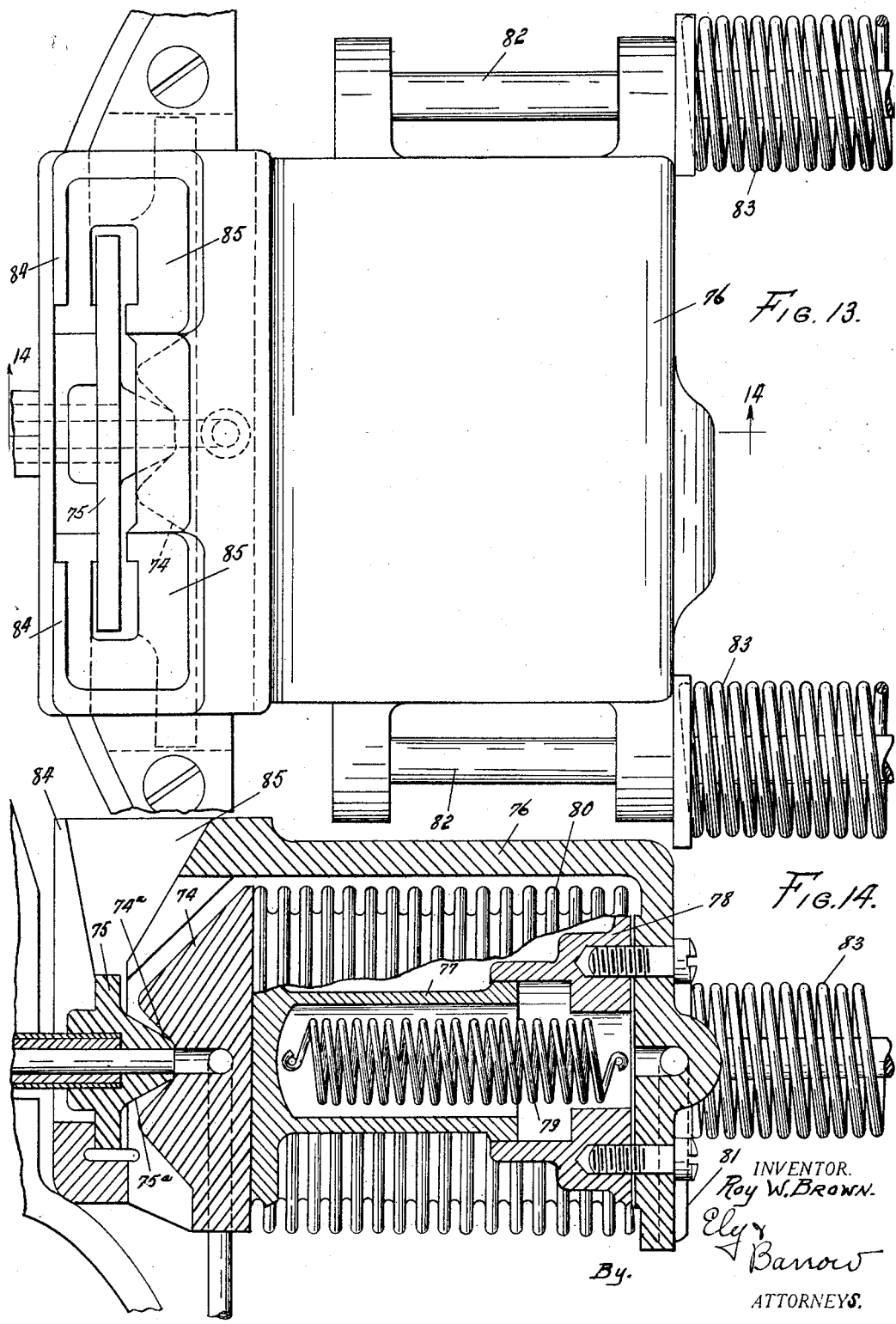

Patented May 9, 1933

1,908,282

UNITED STATES PATENT OFFICE

ROY W. BROWN, OF AKRON, OHIO, ASSIGNOR TO THE FIRESTONE TIRE & RUBBER COMPANY, OF AKRON, OHIO, A CORPORATION OF OHIO

VULCANIZER

Application filed July 3, 1929. Serial No. 375,625.

This invention relates to vulcanizers.

It has been the general practice in the art of vulcanizing tires for some time to utilize large autoclave presses in which a large number of tire molds are stacked and held under pressure during treatment with steam applied to the molds at a vulcanizing temperature, the tires being expanded by air or heating mediums such as hot water under pressure supplied to pressure bags incorporated therein.

More recently there has been a tendency, because of many disadvantages to the above system, to provide unit vulcanizers each capable of vulcanizing a single tire or inner tube, and preferably automatically controlled throughout the vulcanizing period. This invention relates to such unit vulcanizers and has for its general object the provision of an improved vulcanizer of this type.

One purpose of the invention is to provide a vulcanizer unit including separable sections one of which contains a fluid pressure operated pressure-applying member or ram, and means operable by movement of the vulcanizer sections to and from cooperative relation, respectively to establish and disconnect a supply line of fluid pressure medium to said ram.

Another purpose of the present invention is to provide a vulcanizer so constructed as to avoid the formation of the usual rind about the periphery of the tire which heretofore has required time and labor for removal during the finishing operations performed subsequent to vulcanization.

Another purpose is to provide means associated with said vulcanizers for withdrawing air from the molds as they are closed to prevent the formation of light spots or areas in the treads of the completed tires.

Another purpose is to provide a vulcanizer including chambers for steam or the like for heating the mold surfaces, and means for effectively insulating said steam chambers from the outside of the unit.

Another purpose of the invention is to provide improved means for establishing connections permitting circulation of steam through separable chambers and mold sections as they are brought into cooperation with each other.

Another purpose of the invention is to provide in combination with a tire vulcanizer improved means for establishing connections to the pressure bags contained in the tires for circulation of a heating medium therethrough.

The foregoing and other purposes or objects of the invention are attained in the vulcanizer units disclosed herein and in the accompanying drawings. It is to be understood that the invention is not limited to the particular forms thereof disclosed.

Of the accompanying drawings,

Figure 1 is a plan view of a vulcanizer unit embodying the invention, certain sectors thereof being sectional plans of portions of the unit;

Figure 2 is a part elevation and part radial section thereof on line 2—2 of Figure 1;

Figure 3 is a part elevation and part radial section thereof on line 3—3 of Figure 1;

Figure 4 is a part elevation and part radial section of the fluid pressure connections established when the molds are closed to permit operation of the ram;

Figure 7:
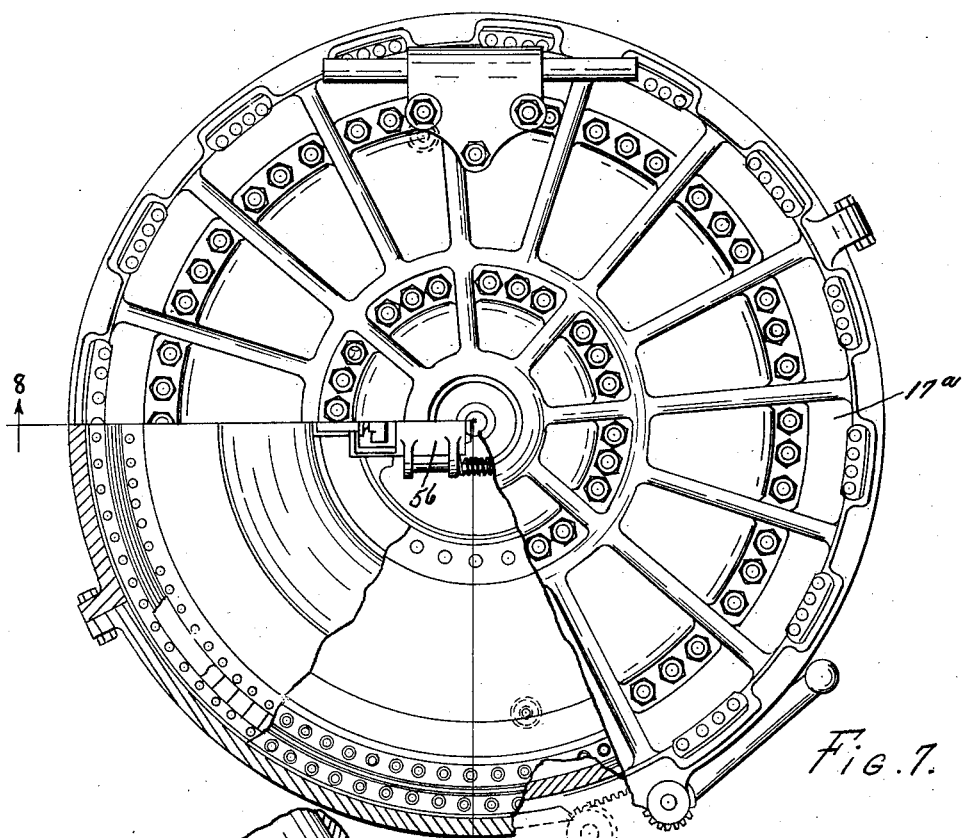
Figure 9:
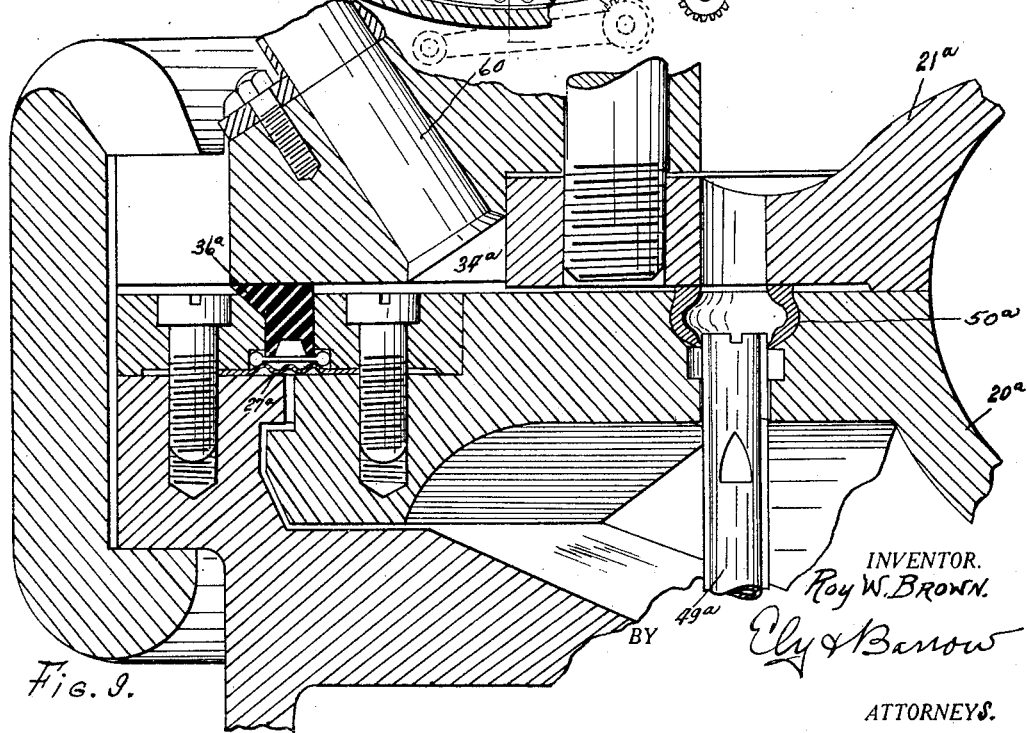
Figure 10:
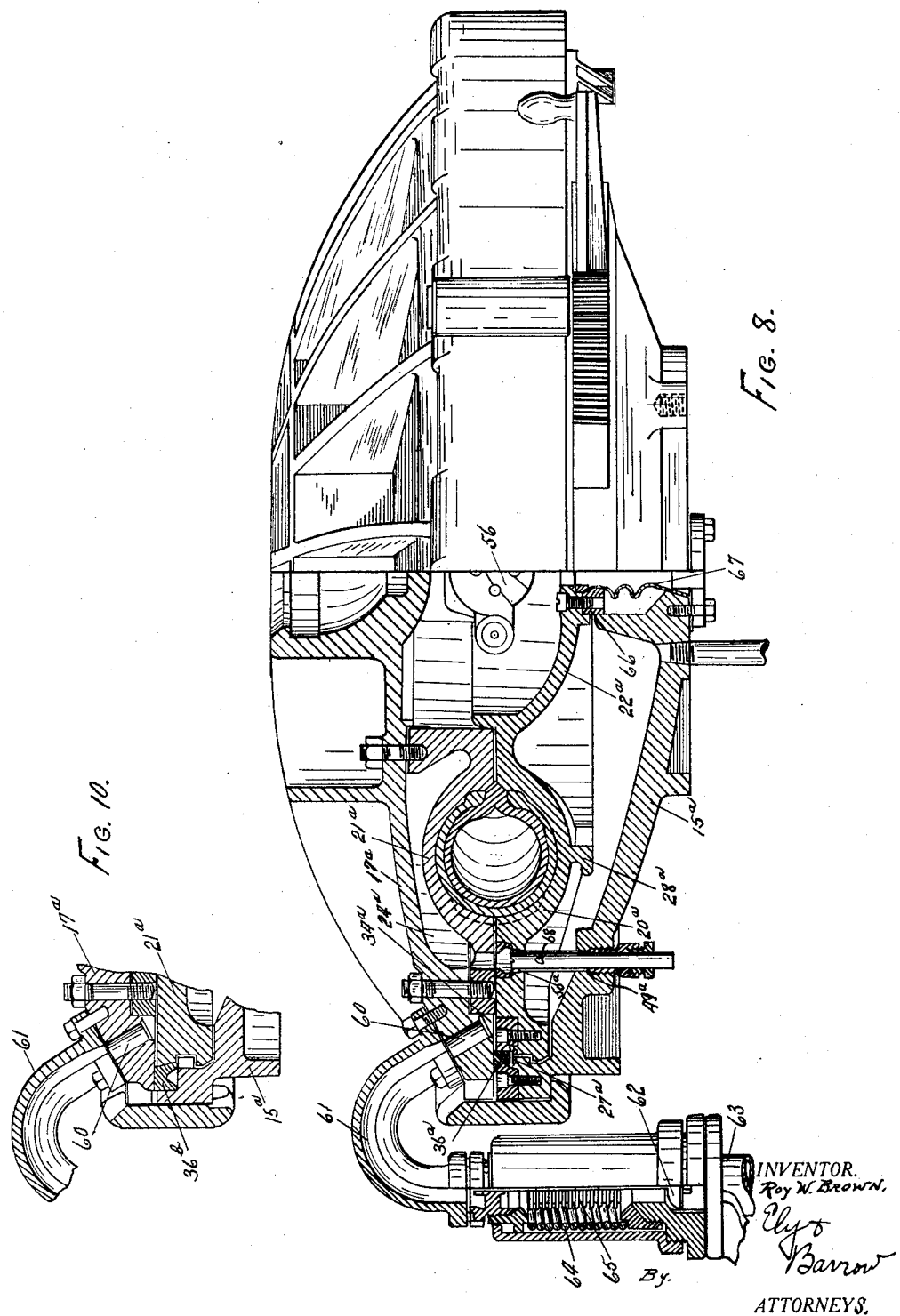
Figure 11:
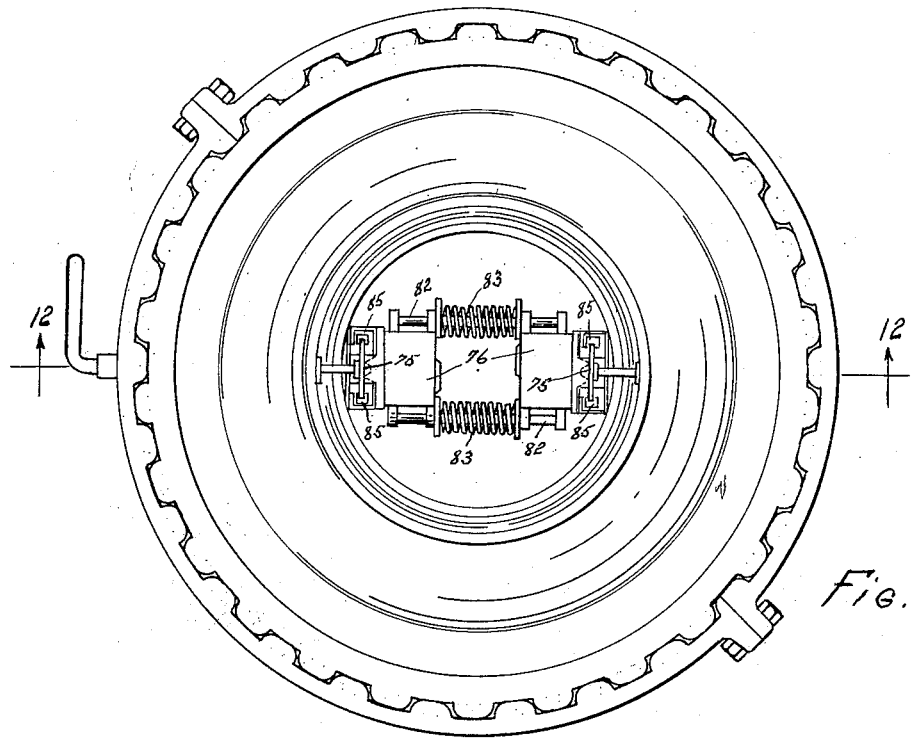
Figure 12:
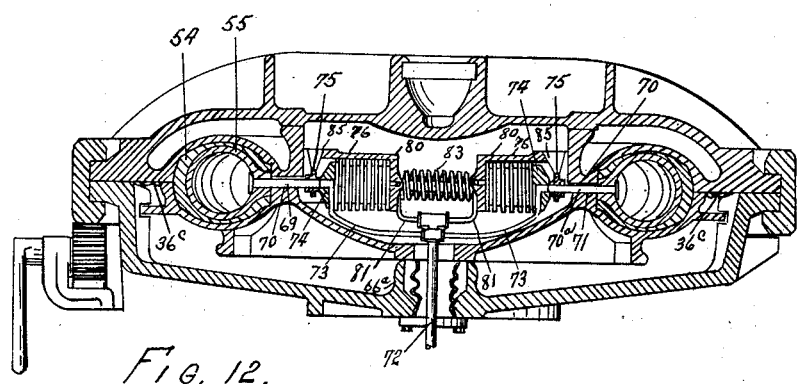

Figures 5 and 6 respectively show the engaged and disengaged positions of the connections for circulating the curing medium through both sections of the vulcanizer;

Figure 7 is a plan view of another vulcanizer unit embodying the invention;

Figure 8 is a part elevation and part radial section thereof on line 8—8 of Figure 7;

Figure 9 is an enlarged detail section of the joint between the vulcanizer sections when closed;

Figure 10 is a similar section reduced in size of another form of joint which may be employed between the sections;

Figure 11 is a sectional plan of a third vulcanizer unit embodying the invention and illustrating the pressure bag supply connections which may be used with all forms of the invention;

Figure 12 is a section on line 12—12 of Figure 11;

Figure 13 is an enlarged plan of a portion of the pressure bag connections; and

Figure 14 is a section on line 14—14 of Figure 13.

Referring to Figures 1 to 6 of the drawings, the numeral 15 designates a lower vulcanizer section which may be mounted on supports 16, 16 and the numeral 17 represents an upper vulcanizer section arranged to cooperate therewith and which may be provided with a socket 18 with which handling apparatus (not shown) may be engaged to open or close the vulcanizer, a hinge member 19 being mounted on the section 17 for cooperation with said apparatus to swing the vulcanizer section upwardly to expose its mold surface for treatment between vulcanizing operations.

The lower section 15 has a lower mold section 20 mounted therein and the upper vulcanizer section 17 has a mold section 21 therein secured onto a ram 22 shiftably mounted in said upper section for limited relative movement respecting the same. Each mold section is chambered as at 23 and 24 respectively, for the introduction of a fluid heating medium such as steam therein. The mold sections are arranged to be accurately guided into mating relation by suitable guiding means indicated respectively at 25 and 26 on the upper and lower mold sections.

The ram 22 is yieldingly supported on the upper vulcanizer section by an annular diaphragm 27 secured respectively to the upper section and ram by rings 28 and 29 and downward movement of said ram is limited by cooperating shoulders on the upper section and ram at 30.

The vulcanizer sections are arranged to be secured together as by a suitable locking ring of the bayonet type such as shown at 31, said ring being circumferentially shiftable on the lower vulcanizer section by a rack and pinion means at 32 operable by a crank 33 and when locked together the vulcanizer houses the molds.

The vulcanizer sections are preferably provided with means such as ribs 34 for supporting the molds away from the surface of the vulcanizer to provide a space about the molds from which air can be drawn by suitable suction means connected to the interior of the vulcanizer by a duct 35, whereby an insulating vacuum may be produced about the chambered molds during vulcanization and also whereby air in the molds will be withdrawn through the crack between the mold halves at the start of the vulcanizing operations. The vulcanizer is accordingly arranged to be sealed as by a gasket 36 at the joint between its sections. The ram 22 may also be chambered as at 37 with ports 38 connecting the chamber to the interior of the vulcanizer so that the ram is vacuum insulated also.

Connections to a source of supply of a hydraulic pressure medium to the ram to hold the mold sections together under pressure during vulcanization are provided for by a duct 39 leading through the ram 22 to a space 40 between the ram and upper vulcanizer section, a check valve 41 being secured on the ram at the bottom of duct 39 and arranged to be engaged and opened by a valve 42 yieldingly mounted on the lower vulcanizer section and seating on valve 41 at 43ª to establish a joint between the two valves when the vulcanizer sections are in cooperation, the inlet 44 to valve 42 being connected by a suitable flexible connection 43 to a hydraulic pressure line 44. A stem 45 on valve 41 is arranged to be actuated by valve 42 to open check valve 41 (Figure 4). Another stem 46 may be secured to valve 42 to be operable against a crank 47 controlling a valve 48 on suction line 35 to make connections for withdrawing the air from the vulcanizer at the same time the hydraulic pressure connections are made.

The steam or other curing medium is supplied to the lower mold section 20 by an inlet duct 49 extending through the lower vulcanizer section and connections for supply of steam to the upper mold section 21 are provided by ducts 50 on the inner and outer edges of the lower mold section cooperating with ducts 51 correspondingly located in the upper mold section 21, the joint between said ducts being packed to prevent leakage by rubber sleeves 52 mounted in the upper ends of the lower ducts 50 and adapted to be compressed by movement of the mold sections into mating relation (Figures 5 and 6). The outlet for the steam permitting its circulation through the molds during vulcanization is provided by a duct 53 extended through the lower vulcanizer section and connected to the lower mold chamber.

A tire being vulcanized in the vulcanizer is shown at 54 together with the enclosed pressure bag 55 to which an expanding and preferably also a curing medium may be supplied and if desired, circulated connections therefor being indicated at 56 which will be more fully described in connection with one of the other forms of vulcanizers disclosed herein. These connections 56 being fluid pressure operated as will be described, are connected by a duct 57 to the hydraulic line 44.

The form of the invention shown in Figures 7 to 10 differs from the first form in several respects. Instead of mounting the ram 22ª in the upper vulcanizer section 17ª, it is mounted in the lower section 15ª and instead of chambering the mold sections 20ª and 21ª, the former is made integral with the ram and a pressure medium is supplied to the lower vulcanizer both for operating the ram and for applying vulcanizing heat to the lower mold, and the latter is secured to the upper vulcanizer section with a space 24ª being provided between the mold section and the upper vulcanizer section for receiving the heating medium.

In this form of the invention the vacuum insulation is dispensed with but an annular vacuum chamber 34ª is provided in the upper vulcanizer section about the crack between the mating mold sections to withdraw air from the molds, the chamber 34ª being connected by a duct 60 to a goose-neck 61 arranged to move into cooperation with a relatively fixed suction valve 62 on a suction line 63, said valve being yieldingly mounted on a spring 64 and a contractile corrugated sleeve or duct 65 providing the suction line through the valve being contractible with the valve spring.

The ram 22ª is also slidably engaged at the center in a sleeve 66 on the lower vulcanizer section, an expansible and contractible sleeve 67 being clamped between the lower vulcanizer section and the ram to seal the sliding joint.

It will be noted that sealing gasket 36ª is so arranged in this form of the invention as to be urged in sealing pressure with the upper vulcanizer by action of the fluid pressure on the ram acting through the diaphragm annulus 27ª. In this form of the invention, this annulus may be omitted as shown in Figure 10, a pressure-actuated gasket 36ᵇ only being used.

In order to insure proper circulation of steam or other heated curing medium in back of both mold sections, the inlet duct 49ª is extended through the lower steam chamber to the duct 50ª and apertures are provided therein in the lower steam chamber as at 68.

A quite similar form of vulcanizer is shown in Figures 11 and 12, no means being shown in this form for evacuating the molds and a different form of sealing gasket being indicated at 36ᶜ.

These views more particularly disclose the connections 56 for circulation of a heated pressure medium through the pressure bag 55 as employed in all forms of the invention. The pressure bags 55 are preferably provided with diametrically opposite duct stems 69 and 70ª secured therein and extending inwardly therefrom through apertures 70 and 71 in the molds. A supply line 72 extends upwardly through sleeve 66ª and is connected by flexible branch ducts 73, 73 to connection members 74, 74 arranged for cooperation with connection members 75, 75 on the stems 69. Connection members 74 are shiftable in supporting members 76, 76 by means of sleeves 77 thereon slidable in a sleeve member 78 mounted on said supporting members, said connection members being normally urged inwardly of the vulcanizer by springs 79 between said connection members and the supporting members. An expansible and contractible corrugated tube 80 is secured between the supporting member 76 and the connection member 74 about the sleeves 77 and 78, and flexible branch ducts 81, 81 are connected to the interiors of said tubes 80 through the supporting member 76.

The supporting members 76 are shiftably mounted on rods 82, 82 and are normally urged outwardly thereon by springs 83, 83. These supporting members 74 have jaws 84, 84 thereon provided with downwardly tapered openings 85, 85 in the upper surfaces thereof adapted to guide connection members 75 into cooperation with connection members, member 74 having a conical socket 74ª and member 75 a conical plug formation 75ª for engaging in socket 74ª (Figures 13 and 14).

In the use of all forms of the invention the tire 54 and air bag 55 are inserted in the lower mold while the vulcanizer is open, the connection members 75 being pushed down in jaws 84 into cooperation with connection members 74. The upper vulcanizer section is then pressed onto the lower vulcanizer section to close the molds and the locking ring is rotated to lock the sections together.

The supply of a hydraulic pressure medium to the ram, of steam or other curing mediums to the chambered molds and hot water or other pressure medium to the bags, is then connected to the vulcanizer, the suction connections if any, being made slightly in advance of the application of final pressure to the molds so that air is effectively withdrawn from the molds and the pressure bag pressure being applied subsequent to closing of the molds.

Due to the floating action of that mold section carried by the ram, it seats accurately upon the other mold section and pinching of the tire or formation of a rind thereon is avoided. The pressure bag pressure forces the pressure bag connections into tight contact by action thereon in the expansible tube 80.

The tire is vulcanized for the required period and at the end thereof the supplies of the various pressure and curing mediums and the suction are disconnected, the locking ring released, the vulcanizer opened, and the completed tire removed. The molds are then treated to receive another tire to be vulcanized.

It will appear from the foregoing that simple effective vulcanizer units have been provided by the invention. Obviously modifications thereof may be resorted to without departing from the spirit thereof or the scope of the appended claims.

What is claimed is:

1. A vulcanizer unit comprising relatively movable vulcanizer sections for enclosing a vulcanizing mold, said mold comprising sections housed respectively in the vulcanizer sections and relatively movable therewith, one of said vulcanizer sections carrying a ram therein on which one mold section is mounted to be pressed against another mold section, said ram being angularly movable relatively to said vulcanizer section whereby the mold sections will seat accurately on each other when pressure of the ram is applied.

2. A vulcanizer unit comprising relatively movable upper and lower vulcanizer sections for enclosing a vulcanizing mold, said mold comprising sections housed respectively in the vulcanizer sections and relatively movable therewith, the upper of said vulcanizer sections carrying a ram therein on which one mold section is mounted to be pressed against another mold section, and a diaphragm supporting the ram on said upper vulcanizer section for relative angular movement, whereby the mold sections will seat accurately on each other when pressure of the ram is applied.

3. A vulcanizer unit comprising relatively movable upper and lower vulcanizer sections for enclosing a vulcanizing mold, said mold comprising sections housed respectively in the vulcanizer sections and relatively movable therewith, the upper of said vulcanizer sections carrying a ram therein on which one mold section is mounted to be pressed against another mold section, said ram floating in said vulcanizer section whereby the molds will seat accurately on each other when pressure of the ram is applied, and means for supplying fluid under pressure to the ram including a valve associated with the upper vulcanizer section and a valve member associated with the lower vulcanizer section and cooperating when the sections are moved together.

4. A vulcanizer unit comprising relatively movable upper and lower vulcanizer sections for enclosing a vulcanizing mold, said mold comprising sections housed respectively in the vulcanizer sections and relatively movable therewith, the upper of said vulcanizer sections carrying a ram therein on which one mold section is mounted to be pressed against another mold section, means for connecting a suction line to the interior of the vulcanizer to evacuate the molds prior to vulcanization, said ram floating in said vulcanizer section whereby the molds will seat accurately on each other when pressure of the ram is applied, and means for supplying fluid under pressure to the ram including a valve associated with the upper vulcanizer section and a valve member associated with the lower vulcanizer section and cooperating when the sections are moved together, said valve member controlling the suction line connection.

5. The combination in a vulcanizer including a sectional vulcanizer casing and a sectional chambered mold, the sections of which are supported respectively in the vulcanizer sections, one being carried by a ram in one section, the mold sections being so mounted as to leave a space in the vulcanizer about the mold, of means for evacuating the vulcanizer space about the mold and withdrawing air from within the molds through a space therebetween prior to forcing of the mold sections together by said ram.

6. The combination with a vulcanizer comprising relatively movable upper and lower vulcanizer sections, upper and lower chambered mold sections carried by said vulcanizer sections in spaced relation thereto, of means for connecting the chambers of the upper and lower mold sections whereby a heating fluid may circulate between said chambers, and means for connecting the space between said mold and vulcanizer sections to a vacuum line, said connecting operations being automatically effected when the vulcanizer sections are brought together.

7. The combination with a sectional tire vulcanizer having relatively movable sections for housing a sectional tire mold, said mold including sections respectively supported by the vulcanizer sections, of means for supplying a pressure medium to the interior of a tire in said mold including a connection member associated with the tire and a connection means associated with one vulcanizer section including a second connection member and a jaw member relatively yielding, the jaw member being adapted for guiding the first connection member into cooperation with the second connection member as the tire is mounted in the one said vulcanizer section, and means operable by pressure of the expanding medium for urging said connection members together.

8. A vulcanizer comprising a sectional casing, a ram in the casing, a flexible diaphragm supporting the ram in the casing and defining a fluid pressure chamber, a sectional mold in the casing, one section of the mold carried by the ram, means for heating the mold sections, and means independent of said heating means for admitting the fluid under pressure into said chamber.

9. A vulcanizer comprising a sectional casing, a ram in the casing, a flexible diaphragm supporting the ram in the casing and defining a fluid pressure chamber, a sectional mold in the casing, one section of the mold carried by the ram, and means for admitting the fluid under pressure into said chamber, said mold sections being jacketed for the introduction of a heated curing medium independently of the fluid pressure medium.

10. A vulcanizer comprising a sectional casing, a ram mounted in one section of the casing, a flexible diaphragm supporting said ram in said section of the casing and defining a fluid pressure chamber therein, a sectional mold in the casing, one section of the mold being carried by said ram, the other section of the mold being carried by the other section of said casing, means for introducing fluid under pressure to said chamber, and means independent of said fluid pressure medium for heating said mold sections.

11. A vulcanizer comprising a sectional casing, a ram mounted in one section of the casing, a flexible diaphragm supporting said ram in said section of the casing and defining a fluid pressure chamber therein, a sectional mold in the casing, one section of the mold being carried by said ram, the other section of the mold being carried by the other section of said casing, and means for introducing fluid under pressure to said chamber, said mold sections being jacketed for the introduction of the fluid heating medium therein independently of the fluid pressure medium.

12. In combination, a vulcanizing mold for vulcanizing hollow rubber articles while under internal pressure, said mold having depressions in the surfaces of the molding cavities for forming projections upon the outer surfaces of the articles, means for heating the mold, means for supplying a fluid medium under pressure to the interior of the articles, means for closing the mold against pressures greater than atmospheric pressure to maintain the mold closed against the expansion of the articles under internal pressure therein, and means for applying suction to the mold as it is closed and while it is heated to withdraw air or gases from said depressions as the rubber of the articles flows into said depressions.

In witness whereof I have hereunto affixed my signature this 21st day of June 1929.

ROY W. BROWN.